United States Patent
Kajihara

(10) Patent No.: US 8,740,309 B2
(45) Date of Patent: Jun. 3, 2014

(54) SEAT GAP HIDING STRUCTURE

(71) Applicant: Toyota Boshoku Kabushiki Kaisha, Aichi-ken (JP)

(72) Inventor: Takehiro Kajihara, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 79 days.

(21) Appl. No.: 13/653,835

(22) Filed: Oct. 17, 2012

(65) Prior Publication Data

US 2013/0093233 A1 Apr. 18, 2013

(30) Foreign Application Priority Data

Oct. 18, 2011 (JP) ................................. 2011-228629

(51) Int. Cl.
  *B60R 22/00* (2006.01)
(52) U.S. Cl.
  USPC .................. 297/481; 297/452.38; 297/463.1; 297/463.2
(58) Field of Classification Search
  CPC .................. B60R 2022/006; B60R 2022/021; B60R 22/03; B60N 2/441
  USPC ............... 297/452.38, 463.1, 463.2, 481, 482
  See application file for complete search history.

(56) References Cited

U.S. PATENT DOCUMENTS

| | | | | |
|---|---|---|---|---|
| 2,571,574 | A * | 10/1951 | Hicks | 297/182 |
| 4,948,195 | A * | 8/1990 | Saunders | 297/182 |
| 5,139,311 | A * | 8/1992 | Imai et al. | 297/481 |
| 6,416,128 | B1 * | 7/2002 | Fujii | 297/218.1 |
| 6,582,016 | B1 * | 6/2003 | Kirchoff et al. | 297/253 |
| 6,722,733 | B2 * | 4/2004 | Schmidt et al. | 297/229 |
| 7,699,396 | B2 * | 4/2010 | Ghisoni et al. | 297/253 |
| 7,931,335 | B1 * | 4/2011 | Siklosi et al. | 297/229 |
| 8,434,828 | B2 * | 5/2013 | Arata et al. | 297/481 |

FOREIGN PATENT DOCUMENTS

JP 2009-001211 1/2009

\* cited by examiner

*Primary Examiner* — Laurie Cranmer
(74) *Attorney, Agent, or Firm* — Greenblum & Bernstein, P.L.C.

(57) ABSTRACT

There is provided a seat gap hiding structure in a vehicle seat where a cutout portion is formed on a seat cushion to arrange a seat belt therein, and a strip-shaped member is provided on a seat cover to correspond to the cutout portion at a part of the cutout portion, which is other than an arrangement position of the seat belt to cover a gap around the seat belt. One end portion of the strip-shaped member is fixed to the seat cover and the other end portion thereof is movably fixed to the seat cover using an elastic member. When the strip-shaped member is moved from an original position where the strip-shaped member covers the gap of the cutout portion, the elastic member generates an elastic force to return the strip-shaped member to the original position.

4 Claims, 4 Drawing Sheets

SEAT GAP HIDING STRUCTURE

BACKGROUND OF THE INVENTION

1. Field of the Invention

The present invention relates to a gap hiding structure of a vehicle seat, in which a cutout portion is formed on a seat cushion to arrange a seat belt therein and which covers and hides a gap of the cutout portion around the seat belt.

2. Description of the Related Art

JP-A-2009-1211 discloses a vehicle seat including such gap hiding structure. Two seat belt buckles are arranged side-by-side in a through-hole which is a cutout portion and a strip-shaped member is disposed between the seat belt buckles to cover the gap between the seat belt buckles.

However, in this structure, when the seat belt buckles are moved in the through-hole as when the seat belt is used for the occupant, the buckles and the strip-shaped member are strongly interfered with each other, and therefore, the strip-shaped member may be separated from a fixed state or may be damaged. As a result, the gap is not covered and the separated strip-shaped member is placed in a disrupted state. Consequently, appearance is deteriorated.

Further, if the seat is a so-called tilt-down seat (a seat which can be more compactly folded such that a seat cushion is retreated downward in conjunction with a forward tilting of a seat back when the seat back is tilted and folded forward relative to the seat cushion), a shield aesthetically covering a seat frame disposed below the through-hole is projected due to the relative movement with the seat cushion when the seat back is largely tilted backward by changing a posture of the seat, and thus the strip-shaped member may be pushed up from below. In this case, if the amount of push-up is larger, the strip-shaped member may be damaged.

SUMMARY OF THE INVENTION

The present invention has been made in view of the above circumstances, and an object of the present invention is to reduce or prevent a normal gap hiding state from being disrupted due to interference of the strip-shaped member with a moving object such as a seat belt by moving the strip-shaped member to follow the moving object.

According to an illustrative embodiment of the present invention, there is provided a seat gap hiding structure in a vehicle seat where a cutout portion is formed on a seat cushion to arrange a seat belt therein, and a strip-shaped member is provided on a seat cover to correspond to the cutout portion at a part of the cutout portion, which is other than an arrangement position of the seat belt to cover a gap around the seat belt, wherein one end portion of the strip-shaped member is fixed to the seat cover and the other end portion thereof is movably fixed to the seat cover using an elastic member, and wherein when the strip-shaped member is moved from an original position where the strip-shaped member covers the gap of the cutout portion, the elastic member generates an elastic force to return the strip-shaped member to the original position.

According to the above configuration, even if a moving object such as the seat belt is moved and interferes with the strip-shaped member, the strip-shaped member can move together with the moving object by the elasticity of the elastic member. Further, as the moving object returns to the original position, the strip-shaped member can also return to the original position by the elastic force of the elastic member. Accordingly, it is possible to avoid the adverse effect such as damage of the strip-shaped member even if the strip-shaped member interferes with the moving object. Further, the strip-shaped member is moved together with the seat belt and therefore can always cover the gap of the cutout portion around the seat belt. Accordingly, it is possible to keep a good appearance.

In the above seat gap hiding structure, the one end portion of the strip-shaped member may be fixed to a portion of the seat cover corresponding to a first position on the seat cushion which opposes the cutout portion, and the other end portion thereof may extend to a portion of the seat cushion opposite to the first position across over the cutout portion. One end portion of the elastic member may be fixed to the seat cover below the strip-shaped member, and the other end portion thereof may be fixed to a portion between the one end portion and the other end portion of the strip-shaped member at a lower surface thereof. When the strip-shaped member is moved from the original position where the strip-shaped member is in contact with a portion of the seat cover across over the cutout portion, the elastic member may generate an elastic force to return the strip-shaped member to the original position.

According to the above configuration, even if the strip-shaped member interferes with the moving object such as the seat belt in accordance with the movement of the seat belt arranged to project from the cutout portion onto a surface of the seat cover or the movement of other moving objects from below, the other end portion of the strip-shaped member is moved upward away from the seat cover by the elasticity of the elastic member and thus it is possible to avoid the adverse effect such as damage of the strip-shaped member. Further, as the moving object such as the seat belt returns to the original position, the strip-shaped member also returns to the original position in which the other end portion of the strip-shaped member is brought into contact with the seat cover by the elastic force of the elastic member and thus can cover the cutout portion around the seat belt.

Further, the elastic member is located below the strip-shaped member in a state where the strip-shaped member covers the cutout portion. Therefore, when viewed from the vehicle occupant, only the strip-shaped member is visible but the elastic member is almost not visible. Consequently, it is possible to improve the appearance without affecting the cumbersome feeling.

In the above seat gap hiding structure, the strip-shaped member may include a first strip-shaped member and a second strip-shaped member. One end portion of the first strip-shaped member may be fixed to a portion of the seat cover corresponding to a first position on the seat cushion which opposes the cutout portion, and one end portion of the second strip-shaped member may be fixed to a portion of the seat cover corresponding to a second position on the seat cushion opposite to the first position across the cutout portion. The other end portions of the first and second strip-shaped members may be overlapped with each other such that the cutout portion is covered by the first and second strip-shaped members, and both end portions of the elastic member may be respectively fixed to lower surfaces of the first and second strip-shaped members on a side of the cutout portion. When the first and second strip-shaped members are moved from the original position where the first and second strip-shaped members configure a single plane at the cutout portion, the elastic member may generate an elastic force to return the first and second strip-shaped members to the original position.

According to the above configuration, since two strip-shaped members are moved together in the form of double doors about one end sides when the strip-shaped members are moved due to interference with the moving object such as the seat belt, the overall movement balance is good, as compared to a case where the strip-shaped member is only one. Consequently, it is possible to improve the appearance of the strip-shaped members when the strip-shaped members are moved while interfering with the moving object such as the seat belt.

Further, the elastic member is located below the strip-shaped member in a state where the strip-shaped member covers the cutout portion. Accordingly, when viewed from the vehicle occupant, only the strip-shaped member is visible but the elastic member is almost invisible. Consequently, it is possible to improve the appearance without affecting the cumbersome feeling.

Moreover, the cutout portion for the seat belt is often provided between adjacent occupant seating surfaces on the seat cushion of the bench-type seat. Also in the seat cover, boundary lines are often formed at both sides of the cutout portion. In a case of such a seat, fixed positions of each one end portion of the both strip-shaped members to the seat cover can be matched to the boundary lines and it is possible to prevent the strip-shaped members from disturbing the design line of the seat cover. Accordingly, it is possible to improve the appearance.

In the above seat gap hiding structure, the strip-shaped member may include a bag body formed by fabric which can be stitched to the seat cover and a rigid plate body inserted in the bag body, so that the strip-shaped member extend across over the cutout portion in a straight line.

According to the above configuration, since the bag body can be stitched to the seat cover, the strip-shaped member and the seat cover can be easily fixed to each other at the same time as sewing the seat cover. In addition, since the plate body is inserted into the bag body, the strip-shaped member can have adequate rigidity which is required to cover the cutout portion. Accordingly, it is possible to prevent the strip-shaped member from falling into the cutout portion due to lack of rigidity, and thus, it is possible to improve the appearance.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Illustrative embodiments of the present invention will be described with reference to the accompanying drawings.

FIRST ILLUSTRATIVE EMBODIMENT

Figure 1:
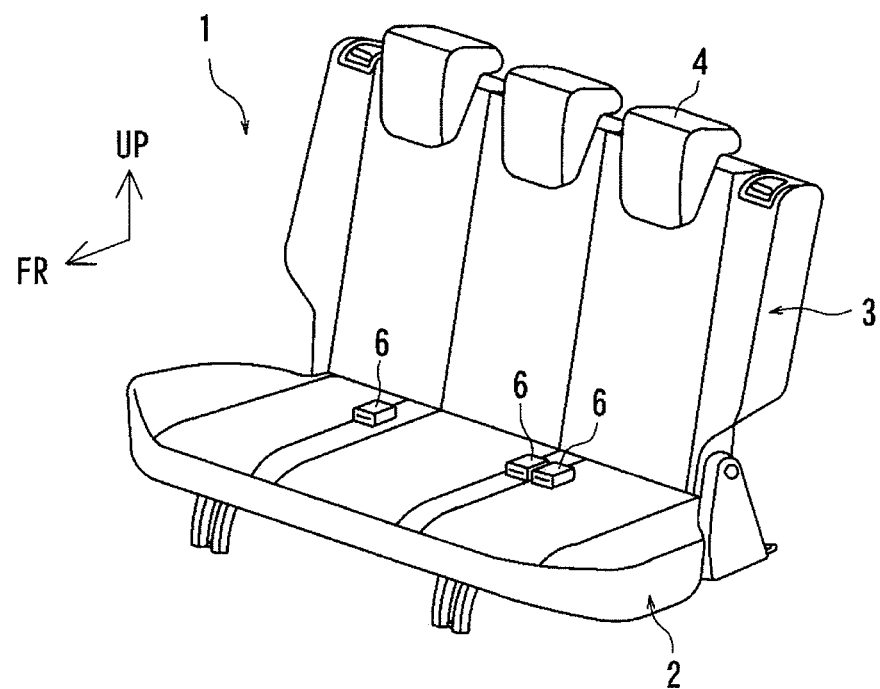
FIG. 1 is an overall perspective view of a vehicle seat having a seat gap hiding structure according to a first illustrative embodiment of the present invention.

FIG. 1 shows a bench-type rear vehicle seat 1 for three persons. The seat 1 mainly includes a seat cushion 2 and a seat back 3. Reference numeral 4 represents three sets of headrest provided on an upper end of the seat back 3.

Although not specifically shown in FIG. 1, a cutout portion is formed on a seating surface of a rear inner side of the seat cushion 2, and a seat belt buckle 6 is arranged through the cutout portion. A fixed end of the seat belt buckle 6 is fixed to a strength member (not shown) of a vehicle floor via the cutout portion.

Figure 2:
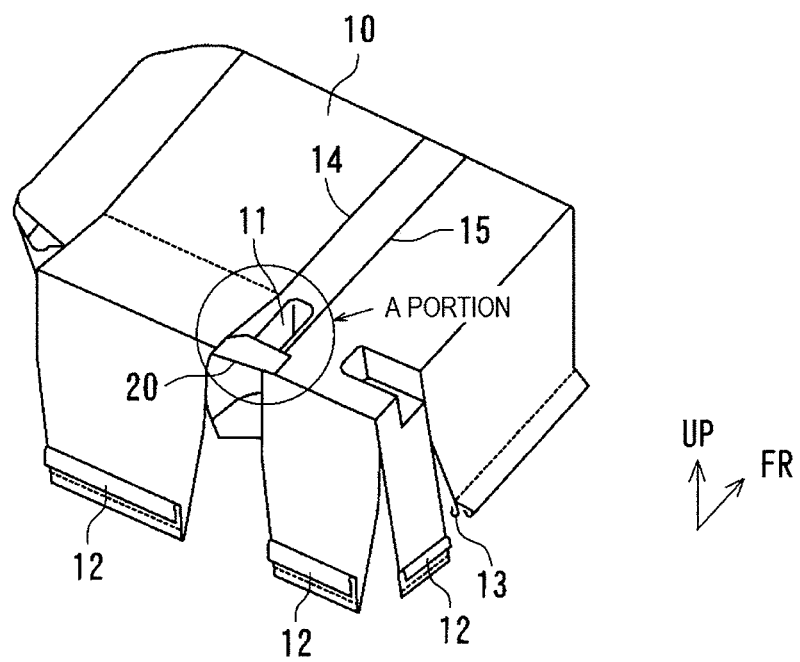
FIG. 2 is a perspective view showing a seat cover of a seat cushion in the first illustrative embodiment.

Although not specifically shown in the drawings, the seat 1 of FIG. 1 is a type which is divided into two parts in a width direction of the vehicle. FIG. 2 shows a seat cover 10 of one seat cushion of the divided type. Although a cushion pad is not shown in FIG. 2, the seat cover 10 covers the cushion pad from the top and is fixed below the cushion pad by a locking means 12, 13 which is hanging down.

The seat cover 10 is formed at its rear end with the cutout portion 11 for arranging the seat belt buckle 6, as mentioned above. A strip-shaped member 20 is formed on a rear end side of the cutout portion 11 to make the cutout portion 11 invisible from the periphery of the buckle 6.

Figure 3:
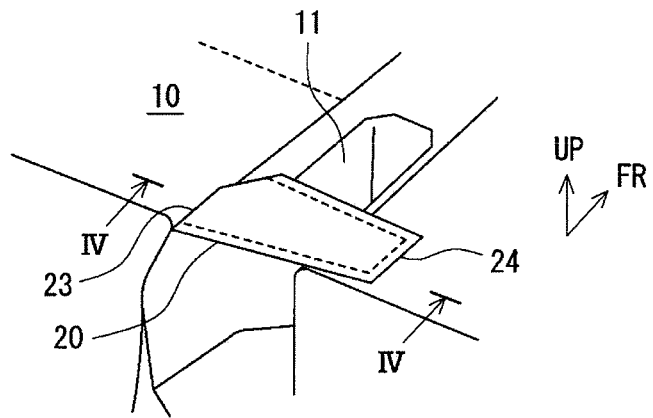
FIG. 3 is an enlarged view of "A" portion of FIG. 2.
Figure 4:
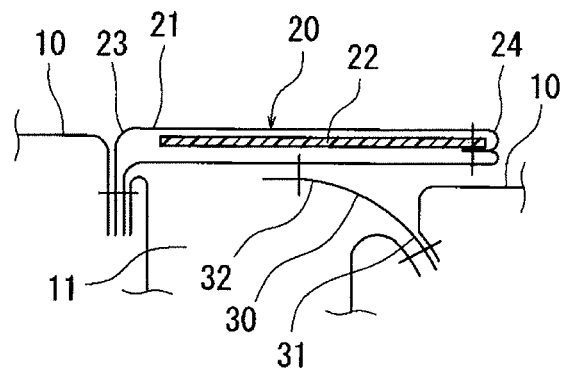
FIG. 4 is a cross-sectional view taken along line IV-IV of FIG. 3.

As shown in FIGS. 3 and 4, one end portion 23 of the strip-shaped member 20 is stitched (fixed) to a portion of the seat cover 10 corresponding to an edge portion (first position) on the seat cushion 2, which opposes the cutout portion 11, and the other end portion 24 of the strip-shaped member 20 extends to a portion of the seat cushion 2 opposite to the first position across over the cutout portion 11.

The strip-shaped member 20 includes a bag body 21 formed by fabric which can be stitched to the seat cover 10 and a rigid plate body 22 inserted into the bag body 21. The bag body 21 is formed by preparing two cloths with area required to cover the cutout portion 11, overlapping two cloths and stitching the periphery of the overlapped cloths, similarly to a pocket of the clothes. The plate body 22 is inserted in size to fill the entire pocket. Further, the plate body 22 is a resin plate and is rigid enough to extend in a straight line across the cutout portion 11. Herein, in an actual sewing process, the periphery of the cloths is sewn in a state where the resin plate is sandwiched between two cloths and the plate is also stitched together with the cloth.

An elastic member 30 is provided below the strip-shaped member 20. One end portion 31 of the elastic member 30 is stitched (fixed) to an edge of the seat cover 10 constituting the cutout portion 11 below the strip-shaped member 20. The other end portion 32 of the elastic member 30 is stitched (fixed) to a portion between the one end portion 23 and the other end portion 24 of the strip-shaped member 20 at a lower surface thereof. That is, the other end portion 24 of the strip-shaped member 20 is movably fixed to the seat cover 10 using the elastic member 30. When the strip-shaped member 20 is moved from an original position where the strip-shaped member 20 is in contact with a portion on the seat cover 10 across over the cutout portion 11, the elastic member 30 generates an elastic (tensile) force to return the strip-shaped member 20 to the original position.

Figure 9:
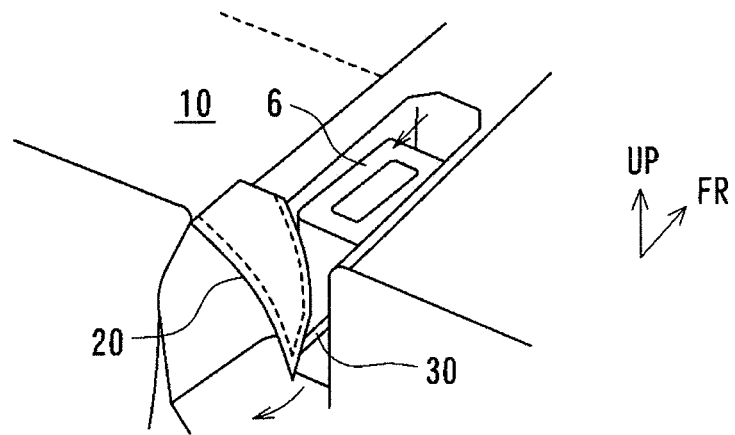
FIG. 9 is an explanatory view showing a usage state of the first illustrative embodiment.
Figure 10:
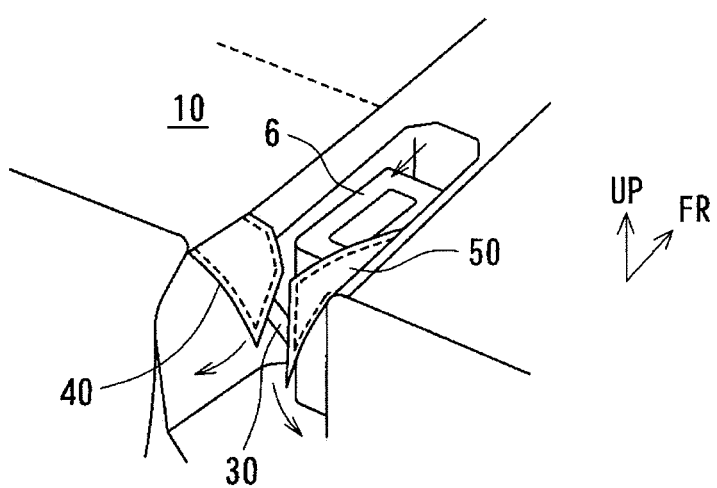
FIG. 10 is an explanatory view showing a usage state of the second illustrative embodiment.

According to the above configuration, even if the seat belt buckle 6 is moved and interferes with the strip-shaped member 20 as indicated by an arrow of FIG. 9, the strip-shaped member 20 can move together with the seat belt buckle 6 to the rear upper side in a direction away from the seat cover 10 as indicated by an arrow, by the elasticity of the elastic member 30. As the seat belt buckle 6 returns to the original position, the strip-shaped member 20 can also return to the original position where the strip-shaped member 20 is in contact with the seat cover 10 by the elastic force of the elastic member 30. Accordingly, it is possible to avoid the adverse effect such as damage of the strip-shaped member 20 even if the strip-shaped member 20 interferes with the seat belt buckle 6. Further, the strip-shaped member 20 is moved together with the seat belt buckle 6, and therefore, it can always cover the gap of the cutout portion 11 around the seat belt buckle 6. Accordingly, it is possible to keep a good appearance.

Further, the elastic member 30 is located below the strip-shaped member 20 in a state where the strip-shaped member 20 covers the cutout portion 11. Therefore, when viewed from the vehicle occupant, only the strip-shaped member 20 is visible but the elastic member 30 is almost not visible. Consequently, it is possible to improve the appearance without affecting the cumbersome feeling.

Furthermore, since the bag body 21 of the strip-shaped member 20 can be stitched to the seat cover 10, the strip-shaped member 20 and the seat cover 10 can be easily fixed to each other at the same time as sewing the seat cover 10. In addition, since the plate body 22 is inserted into the bag body 21, the strip-shaped member 20 can have adequate rigidity which is required to cover the cutout portion 11. Accordingly, it is possible to prevent the strip-shaped member 22 from falling into the cutout portion 11 due to lack of rigidity, and thus, it is possible to improve the appearance.

SECOND ILLUSTRATIVE EMBODIMENT

Figure 5:
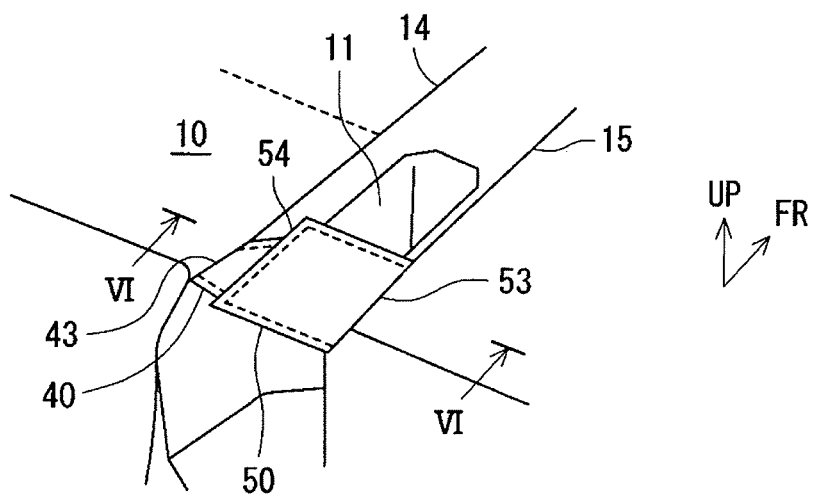
FIG. 5 is a perspective view similar to FIG. 3 showing a second illustrative embodiment of the present invention.
Figure 6:
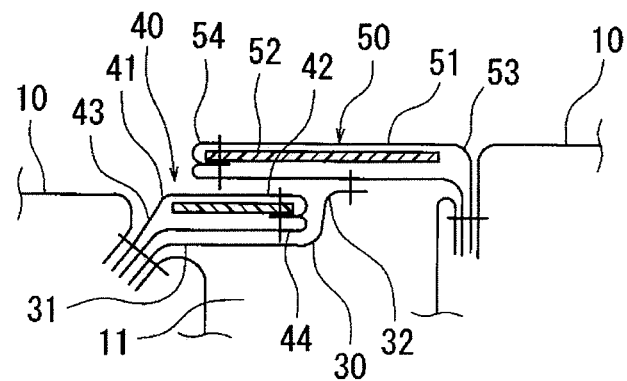
FIG. 6 is a cross-sectional view taken along line VI-VI of FIG. 5.

FIGS. 5 and 6 show a second illustrative embodiment of the present invention. Here, the strip-shaped member includes a first strip-shaped member 40 and a second strip-shaped member 50. One end portion 43 of the first strip-shaped member 40 is stitched (fixed) to a portion of the seat cover 10 corresponding to an edge portion (first position) on the seat cushion 2, which opposes the cutout portion 11. One end portion 53 of the second strip-shaped member 50 is stitched (fixed) to a portion of the seat cover 10 corresponding to an edge portion (second position) on the seat cushion opposite to the first position through the cutout portion 11. Each of the other end portions 44, 54 of both strip-shaped members 40, 50 is overlapped with each other such that the cutout portion 11 is covered by the both strip-shaped members 40, 50. Each of the end portions 31, 32 of the elastic member 30 is respectively fixed to a lower surface of the both strip-shaped members 40, 50 on a side of the cutout portion 11. One end portion 31 of the elastic member 30 is stitched together when the strip-shaped member 40 is stitched to the seat cover 10. The elastic member 30 generates an elastic (tensile) force to return the both strip-shaped members 40, 50 to the original position when the both strip-shaped members 40, 50 are moved from the original position where the both strip-shaped members configure a single plane at the cutout portion 11.

According to the second illustrative embodiment, when the seat belt buckle 6 is moved as indicated by an arrow and the strip-shaped members 40, 50 are moved due to interference with the seat belt buckle 6, two strip-shaped members are moved together in the form of double doors about one end sides, as indicated by arrows. Accordingly, the overall movement balance is good, as compared to a case where the single strip-shaped member is provided. Consequently, it is possible to improve the appearance of the strip-shaped members 40, 50 when the strip-shaped members are moved while interfering with the seat belt buckle 6.

Further, the elastic member 30 is located below the strip-shaped members 40, 50 in a state where the strip-shaped members 40, 50 cover the cutout portion 11. Accordingly, when viewed from the vehicle occupant, only the strip-shaped members 40, 50 are visible but the elastic member 30 is almost not visible. Consequently, it is possible to improve the appearance without affecting the cumbersome feeling.

Moreover, the cutout portion 11 for the seat belt buckle 6 is often provided between adjacent occupant seating surfaces on the seat cushion 2 of the bench-type seat 1. Also in the seat cover 10, boundary lines 14, 15 are often formed at both sides of the cutout portion 11. In a case of such a seat, fixed positions of each one end portion 43, 53 of the both strip-shaped members 40, 50 to the seat cover 10 can be matched to the boundary lines 14, 15 and it is possible to prevent the strip-shaped members 40, 50 from disturbing the design line of the seat cover 10. Accordingly, it is possible to improve the appearance.

THIRD ILLUSTRATIVE EMBODIMENT

Figure 7:
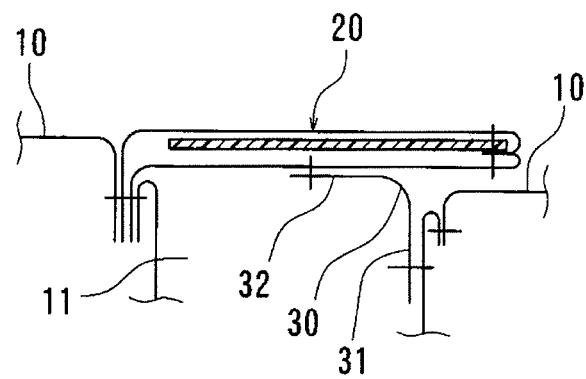
FIG. 7 is a cross-sectional view similar to FIG. 4 showing a third illustrative embodiment of the present invention.

FIG. 7 shows a third illustrative embodiment of the present invention. The third illustrative embodiment is different from the first illustrative embodiment shown in FIG. 4 in the fixed position of one end portion 31 of the elastic member 30. In FIG. 7, the one end portion 31 of the elastic member 30 is stitched to a side wall of the cutout portion 11.

According to the third illustrative embodiment, the one end portion 31 of the elastic member 30 is stitched to a side wall of the cutout portion 11 and the other end portion 32 of the elastic member 30 is stitched to a lower surface of the strip-shaped member 20 above the stitched portion. With this configuration, in order to generate an elastic (tensile) force in the elastic member 30, the fixed position of the other end portion 32 of the elastic member 32 can be approached to the other end portion 24 of the strip-shaped member 20 while maintaining a certain length. Accordingly, the tensile force of the elastic member 30 which returns the strip-shaped member 20 to the original position when the strip-shaped member 20 is moved away from the seat cover 10 is effectively transmitted to the strip-shaped member 20, and thus, it is possible to use the elastic member 30 having a small elastic coefficient.

FOURTH ILLUSTRATIVE EMBODIMENT

Figure 8:
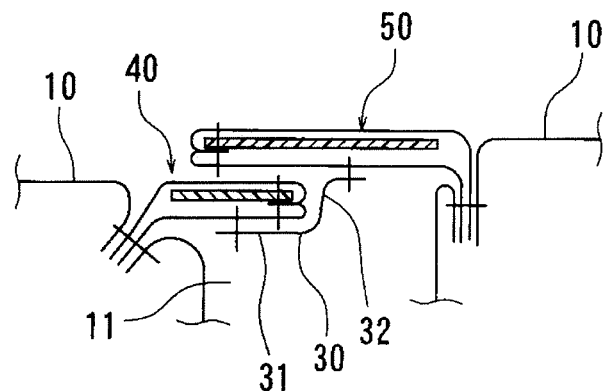
FIG. 8 is a cross-sectional view similar to FIG. 6 showing a fourth illustrative embodiment of the present invention.

FIG. 8 shows a fourth illustrative embodiment of the present invention. The fourth illustrative embodiment is different from the second illustrative embodiment shown in FIG. 6 in the fixed position of one end portion 31 of the elastic member 30.

In FIG. 8, one end portion 31 of the elastic member 30 is stitched to a lower surface of the strip-shaped member 40.

According to the fourth illustrative embodiment, since the elastic member 30 is stitched to a position near the other end side (that is, not a fixed end but a free end side) of the both strip-shaped members 40, 50, the elastic force of the elastic member 30 can be effectively transmitted to the strip-shaped members 40, 50 and thus it is possible to use the elastic member 30 having a small elastic coefficient.

While the present invention has been shown and described with reference to certain illustrative embodiments thereof, it will be understood by those skilled in the art that various changes in form and details may be made therein without departing from the spirit and scope of the invention as defined by the appended claims.

For example, the elastic member may be a string-shaped member instead of the strip-shaped member.

What is claimed is:

1. A seat gap hiding structure in a vehicle seat where a cutout portion is formed on a seat cushion to arrange a seat belt therein, and a strip-shaped member is provided on a seat cover to correspond to the cutout portion at a part of the cutout portion, which is other than an arrangement position of the seat belt to cover a gap around the seat belt, wherein one end portion of the strip-shaped member is fixed to the seat cover and the other end portion thereof is movably fixed to the seat cover using an elastic member, and wherein when the strip-shaped member is moved from an original position where the strip-shaped member covers the gap of the cutout portion, the elastic member generates an elastic force to return the strip-shaped member to the original position.

2. The seat gap hiding structure according to claim 1, wherein the one end portion of the strip-shaped member is fixed to a portion of the seat cover corresponding to a first position on the seat cushion which opposes the cutout portion, and the other end portion thereof extends to a portion of the seat cushion opposite to the first position across over the cutout portion, wherein one end portion of the elastic member is fixed to the seat cover below the strip-shaped member, and the other end portion thereof is fixed to a portion between the one end portion and the other end portion of the strip-shaped member at a lower surface thereof, and wherein when the strip-shaped member is moved from the original position where the strip-shaped member is in contact with a portion of the seat cover across over the cutout portion, the elastic member generates an elastic force to return the strip-shaped member to the original position.

3. The seat gap hiding structure according to claim 1, wherein the strip-shaped member includes a first strip-shaped member and a second strip-shaped member, wherein one end portion of the first strip-shaped member is fixed to a portion of the seat cover corresponding to a first position on the seat cushion which opposes the cutout portion, and one end portion of the second strip-shaped member is fixed to a portion of the seat cover corresponding to a second position on the seat cushion opposite to the first position across the cutout portion, wherein the other end portions of the first and second strip-shaped members are overlapped with each other such that the cutout portion is covered by the first and second strip-shaped members, and both end portions of the elastic member are respectively fixed to lower surfaces of the first and second strip-shaped members on a side of the cutout portion, and wherein when the first and second strip-shaped members are moved from the original position where the first and second strip-shaped members configure a single plane at the cutout portion, the elastic member generates an elastic force to return the first and second strip-shaped members to the original position.

4. The seat gap hiding structure according to claim 1, wherein the strip-shaped member includes a bag body formed by fabric which can be stitched to the seat cover and a rigid plate body inserted in the bag body, so that the strip-shaped member extend across over the cutout portion in a straight line.

* * * * *